United States Patent

[11] 3,593,845

[72] Inventor Louis E. Schwartz
New York Law School, 57 Worth St., New York, N.Y. 10013

[21] Appl. No. 851,333
[22] Filed Aug. 19, 1969
[45] Patented July 20, 1971

[54] TAPE CASETTE ALBUM
5 Claims, 4 Drawing Figs.

[52] U.S. Cl. 206/1, 206/52 F, 206/65
[51] Int. Cl. B65d 85/67
[50] Field of Search 206/1, 72, 75, 65, 52 F, 46 FC, DIG. 32; 220/21; 229/28

[56] References Cited

UNITED STATES PATENTS

| | | | |
|---|---|---|---|
| 2,710,694 | 6/1955 | Carr | 206/65 A |
| 1,716,846 | 6/1929 | Baker | 206/DIG. 32 |
| 3,180,697 | 4/1965 | Mulch | 206/1 |
| 3,232,421 | 2/1966 | Young | 206/52 F |
| 3,261,456 | 7/1966 | Sparks | 206/46 FC |

FOREIGN PATENTS

| | | | |
|---|---|---|---|
| 875,639 | 8/1961 | Great Britain | 206/75 |

*Primary Examiner*—William T. Dixson, Jr.
*Attorney*—Albert F. Kronman

ABSTRACT: A container for a plurality of audio tape casettes in which a plurality of tape casette-receiving recesses are provided with a resilient wall and an elongated ribbon secured to the bottom of each recess. The ribbon is of a length to extend part way around the casette and is provided with a clip at the free end thereof to engage and lock the tape casette reels.

PATENTED JUL 20 1971 3,593,845

INVENTOR.
LOUIS E. SCHWARTZ

ATTORNEY

TAPE CASETTE ALBUM

BACKGROUND OF THE DISCLOSURE

It is well known to enclose reels of magnetic tape for the production of music, speech and the like in cartridges or casettes. These casettes are slipped into the player and do not require threading or further adjustment for operation. Various devices have been provided for storing and carrying the casettes but consist of little more than plastic boxes. Removing individual casettes from such boxes and later returning them in a proper indexed location has been most difficult with presently known devices.

Accordingly, it is an object of the present invention to provide a container in the nature of an album for audio tape casettes which will retain a plurality of casettes for ready transportation, storage and selection.

Another object of the present invention is to provide an audio tape casette album which will occupy a small amount of space while presenting all of the casettes to view for selection.

A further object of the present invention is to provide an audio tape casette album which will insure the proper orientation of the casettes as they are inserted or removed from the album.

SUMMARY OF THE INVENTION

In one preferred embodiment of the present invention the album consists of a traylike member having a rectangular bottom and upstanding peripheral sidewalls secured to or integral with the bottom. The tray is divided in half by a central spacer block. A series of spaced partitions extend between the block and two opposed sidewalls to divide the interior of the tray into a plurality of casette-receiving recesses. A pad of yieldable material such as sponge rubber or foamed urethane or other plastic is secured along one wall in each recess and an elongated ribbon is fastened at one end to the bottom of the tray within each recess. When the casette is placed within the recess, the ribbon extends around the casette and overlies it. A small clip carried by the free end of the ribbon snaps into the reel openings in the casette to prevent unwinding of the tape while the casette is being stored.

DESCRIPTION OF THE DRAWING

In the accompanying drawing forming part hereof similar parts have been given the same reference numerals, in which drawing.

DESCRIPTION OF THE PREFERRED EMBODIMENT

Figure 1:
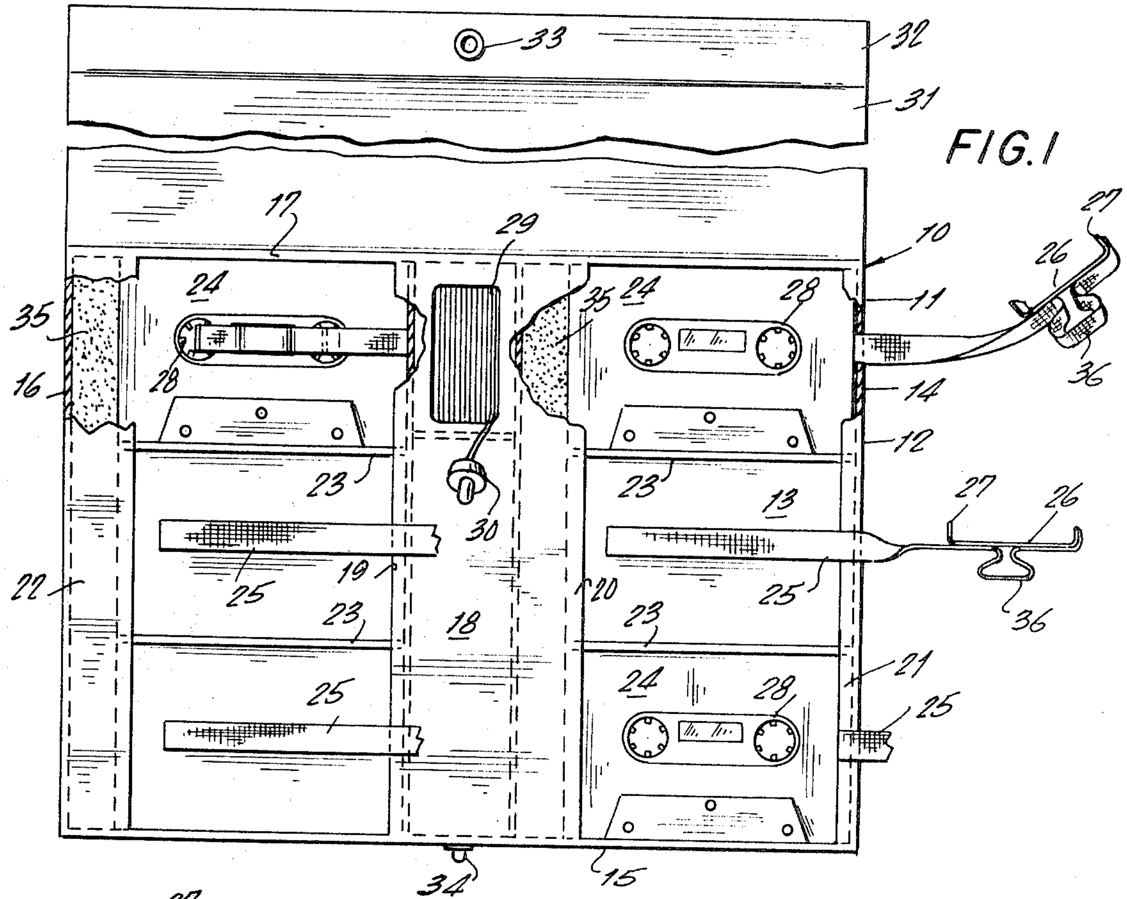
FIG. 1 is a top plan view partly broken away of a complete embodiment of the present invention.
Figures 2, 3:
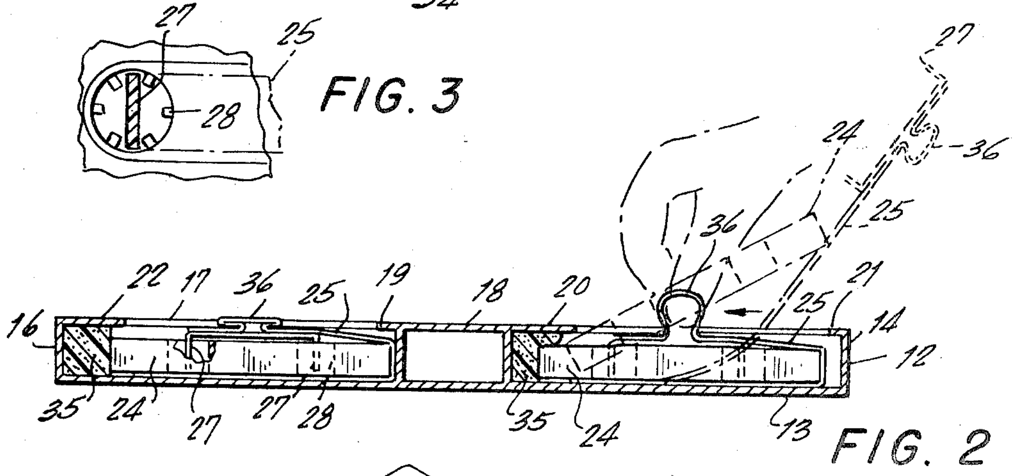
FIG. 2 is a cross-sectional view of the album shown in FIG. 1 illustrating the manner in which a casette is placed within a recess.
FIG. 3 is a fragmentary plan view somewhat enlarged and partly in section of the casette reel and locking clip shown in FIG. 1.
Figure 4:
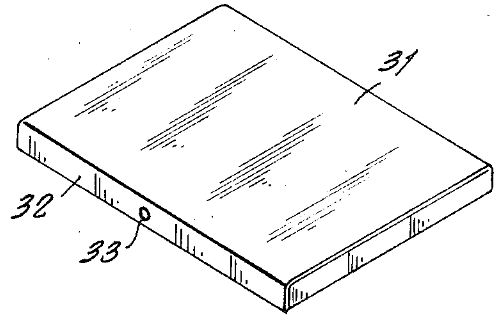
FIG. 4 is a somewhat isometric view of the album shown in FIG. 1 in the closed position.

Referring to the drawing and particularly FIGS. 1 and 2, 10 indicates an audio tape casette album formed of paper, or some suitable plastic. The casette-receiving portion 11 of the album 10 is in the form of a shallow rectangular tray 12 having a bottom 13 and upstanding sidewalls 14, 15, 16, 17. The sidewalls 14, 15, 16, 17, may be integral with the bottom 13 or cemented thereto if desired.

A spacer block 18 carried within the tray 12 substantially divides the tray into two compartments. The spacer block 18 may be moulded into the tray as shown or cemented to the bottom 13 of the said tray. The block 18 is formed with two outwardly extending longitudinal flanges 19, 20, (best shown in FIG. 2). The sidewalls 14, 16, are also provided with inwardly extending longitudinal flanges 21, 22. The function of the flanges 19, 20, 21, 22, will be more fully set forth below.

The space within the tray 12 is further divided into a series of recesses by spaced partitions 23 which extend upwardly from the bottom 13 of the tray 12 and are secured at each end to the block 18 and one of the walls 14, 16. The recesses thus formed are of a size to freely receive one of the casettes 24.

As shown in FIG. 2, the flanges 20, 22 are wider than the flanges 19, 21. The additional width is provided so that a small block 35 of resilient material such as sponge rubber, foamed urethane or the like may be carried at one end of each of the recesses and still leave a small portion of the flanges 20, 22, to overlie the casettes and retain them within the recesses. It will also be seen from an examination of FIG. 2 that the space between the flanges 14, 20, and 19, 22, is smaller than the length of the casette 24 received therebetween.

An elongated ribbon 25 made of silk, cotton, plastic or any other material is cemented to the bottom 13 of the tray 12 within each recess as shown in FIGS. 1 and 2. The free end of the ribbon 25 is cemented or bonded to a U-shaped clip 26. The spaced arms 27 of the clip 26 are of a size which will permit them to snap into the internally splined reels 28 of the casette. The ribbon 25 is of a length which will enable it to wrap around the casette 24 and bring the arms 27 of the clip 26 into register with the openings in the reels 28.

The spaced block 18 is preferably hollow and provided with an opening 29 to receive a personalized ear phone 30 (shown in FIG. 1).

A cover member 31 is hingedly secured along one margin to the tray 12. The free end of the cover 31 is provided with a flap 32 and part of a snap fastener 33. The complimentary portion 34 of the fastener is carried by the tray wall 15 and enables the album to be tightly closed.

When it is desired to insert a casette in the album, the free end of the ribbon 25 is first pulled out of the recess in the manner shown at the right in FIG. 1. The casette 24 is then slipped beneath either flange 20 or 22 as shown in FIG. 2, compressing the resilient block 35 in the manner shown at the right in FIG. 2. The casette 24 can then be pushed downwardly, clearing the opposed flange 21 or 19 until the casette is resting upon the bottom 13 of the tray 12. When the casette is released, the resilient block 35 will push it beneath the opposed flange 21 or 19 locking it in place within the album. A portion of the ribbon 25 will have been partially wrapped around the casette during this operation. The rest of the ribbon 25 may then be folded inwardly and the clip 26 snapped in place.

Removal of one or more casettes from the album requires only the lifting of the end of the ribbon 25 by means of the loop 36. As the ribbon 25 bears against either the flange 19 or 21, it will compress the resilient block 35 by forcing the casette against it. The edge of the casette 24 can then clear the flange 19 or 21, whereupon the block 35 will push it part way out of the receptacle. The casette can then be removed manually.

From the foregoing it will be seen that there has been provided an album for an audio tape casette which will hold a plurality of casettes and from which casettes can be removed with ease. The disposition of the casettes is always proper for insertion in a player and the titles of the programs can be observed if placed on the face of the casette.

Having thus fully described the invention, what I claim as new and desire to be secured by Letters Patents of the United States, is:

1. An audio tape casette album comprising a tray, said tray consisting of a bottom and peripheral upstanding wall members carried by said bottom, a central elongated block secured to the tray and dividing said tray into two compartments, spaced upstanding partitions carried by the tray and secured at one end to the central block and at their opposite ends to a tray wall to divide the tray compartments into a plurality of cassette-receiving recesses, a resilient pad in each recess carried by the tray bottom and adapted to yieldably urge the casette against the opposite side of the recesses, flange members secured to the top of the central block and the tray walls parallel to said central block and extending part way over the receptacles to retain the casette within the album and a ribbon member secured at one end to the tray bottom and extending outwardly thereof so as to overlie a portion of the casette whereby individual casettes may be removed from the album.

2. A device according to claim 1 in which the flange members of each receptacle consist of a larger flange member and a smaller flange member and the resilient pad is disposed beneath the larger flange member.

3. A device according to claim 1 in which the resilient pad is made of spongelike material.

4. A device according to claim 1 in which the free end of the ribbon is provided with a clip for engagement with the audio tape casette.

5. A device according to claim 1 in which one of the peripheral upstanding wall members is formed with a hinged flap which will overlie the tray to enclose the casettes therein.